United States Patent [19]

Gibbs

[11] Patent Number: 5,092,554
[45] Date of Patent: Mar. 3, 1992

[54] TEMPORARY TRANSMISSION/ENGINE SUPPORT SYSTEM

[76] Inventor: Myron F. Gibbs, Route 1, Box 268, Enterprise, Oreg. 97828

[21] Appl. No.: 684,653

[22] Filed: Apr. 12, 1991

[51] Int. Cl.⁵ ............................................. B42F 13/00
[52] U.S. Cl. .................................................. 248/339
[58] Field of Search ............... 248/339, 322, 327, 676, 248/678; 254/DIG. 16, DIG. 9

[56] References Cited

U.S. PATENT DOCUMENTS

| | | | |
|---|---|---|---|
| 1,442,335 | 1/1923 | Griffith . | |
| 4,033,531 | 7/1977 | Levine | 248/676 X |
| 4,558,849 | 12/1985 | Luening et al. | 254/DIG. 16 |
| 4,850,448 | 7/1989 | Stephens | 180/299 |
| 4,899,843 | 2/1990 | Takano et al. | 180/312 |
| 4,971,286 | 11/1990 | Silhan | 248/676 |

Primary Examiner—Ramom O. Ramirez
Attorney, Agent, or Firm—Klarquist, Sparkman, Campbell, Leigh & Whinston

[57] ABSTRACT

A vehicle power train support apparatus is provided for temporarily supporting from a vehicle frame a portion of a vehicle power train. The apparatus includes a telescoping transverse support arm assembly suspended by two eye bolts, and optionally by two chains or straps, from a vehicle frame. A support table is adjustably mounted to the transverse support arm assembly at varying vertical increments. A spring-biased sliding lock plate or latch secures the table at a desired vertical position. The table supports the portion of the vehicle power train.

11 Claims, 4 Drawing Sheets

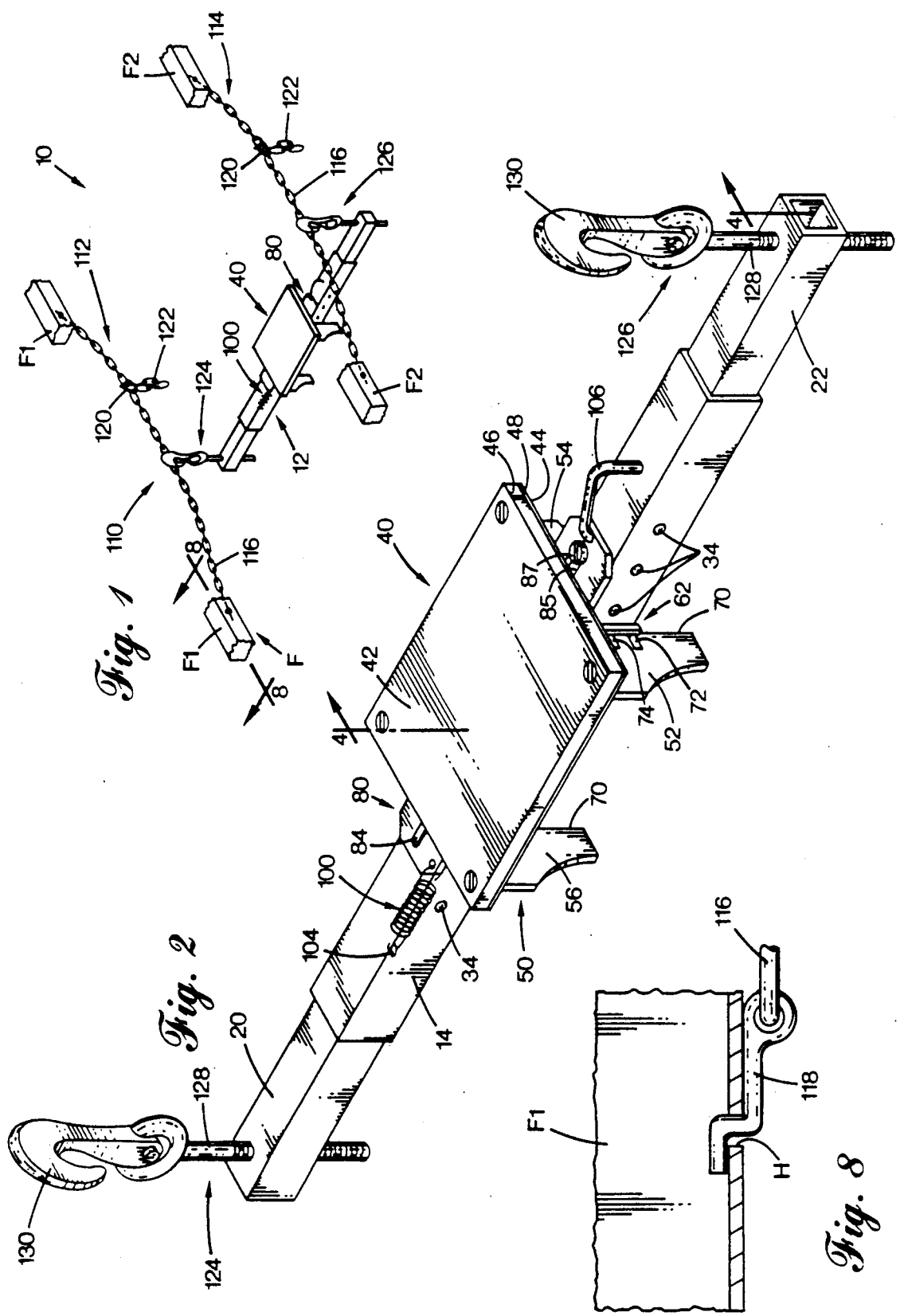

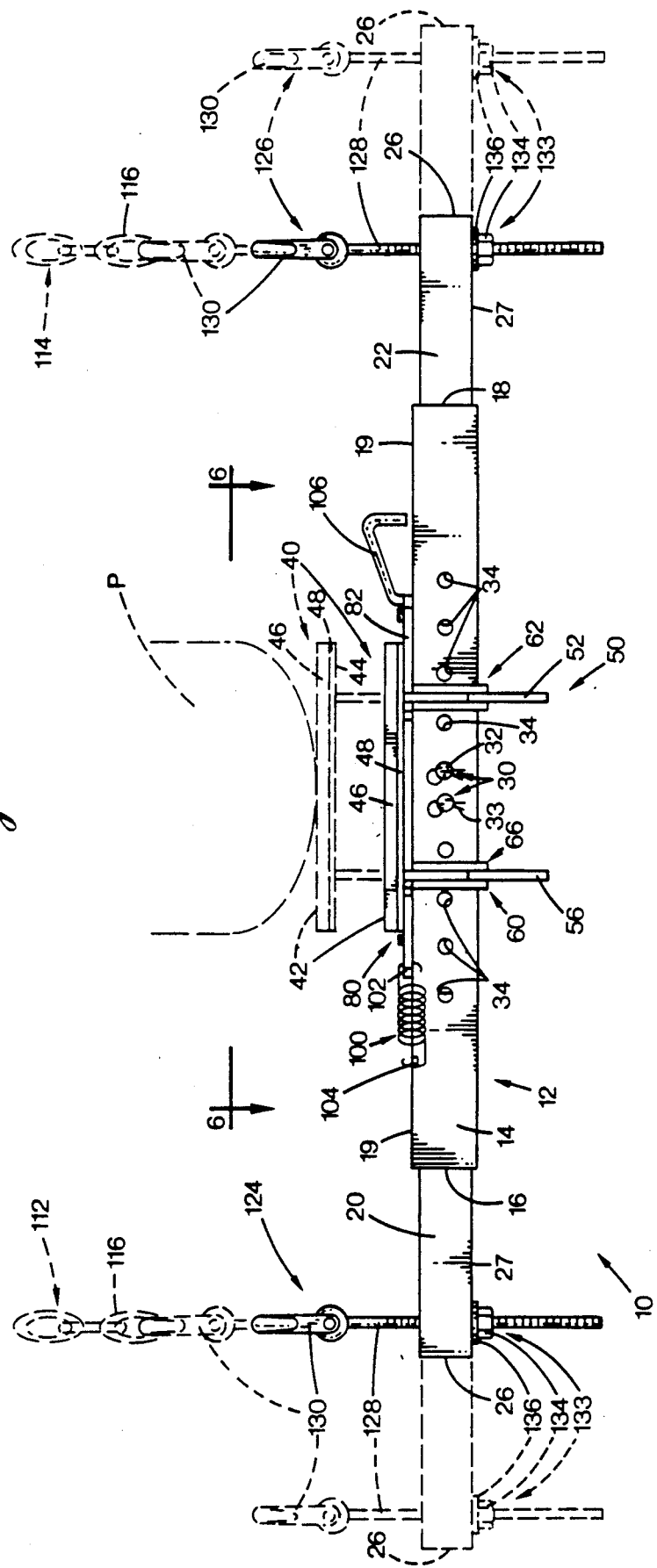

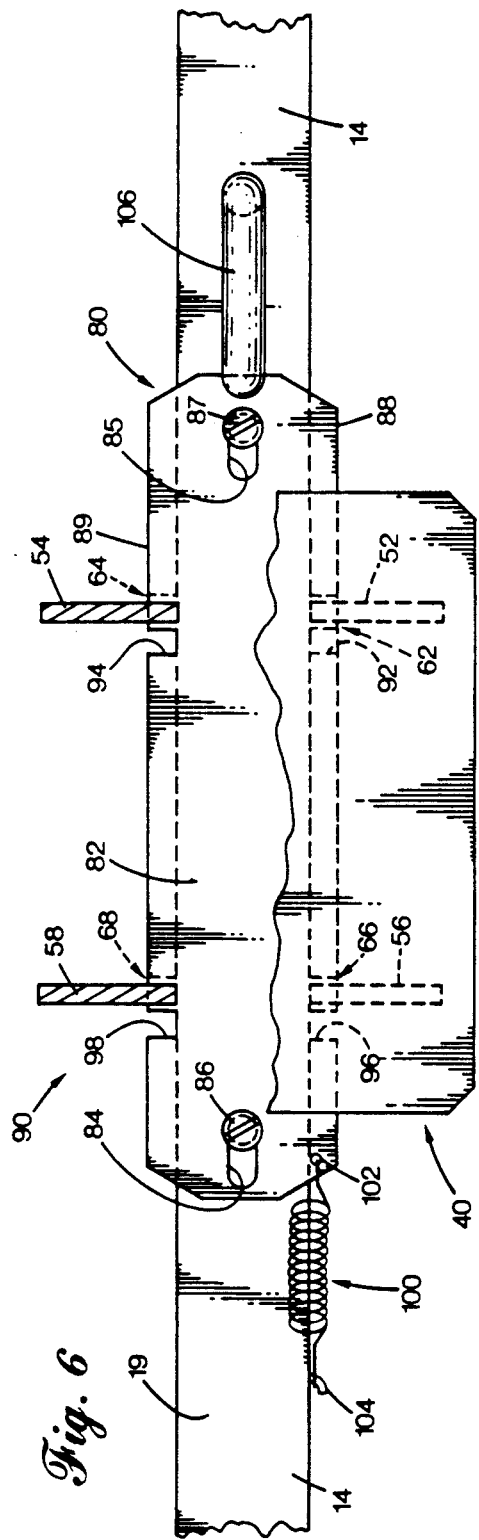
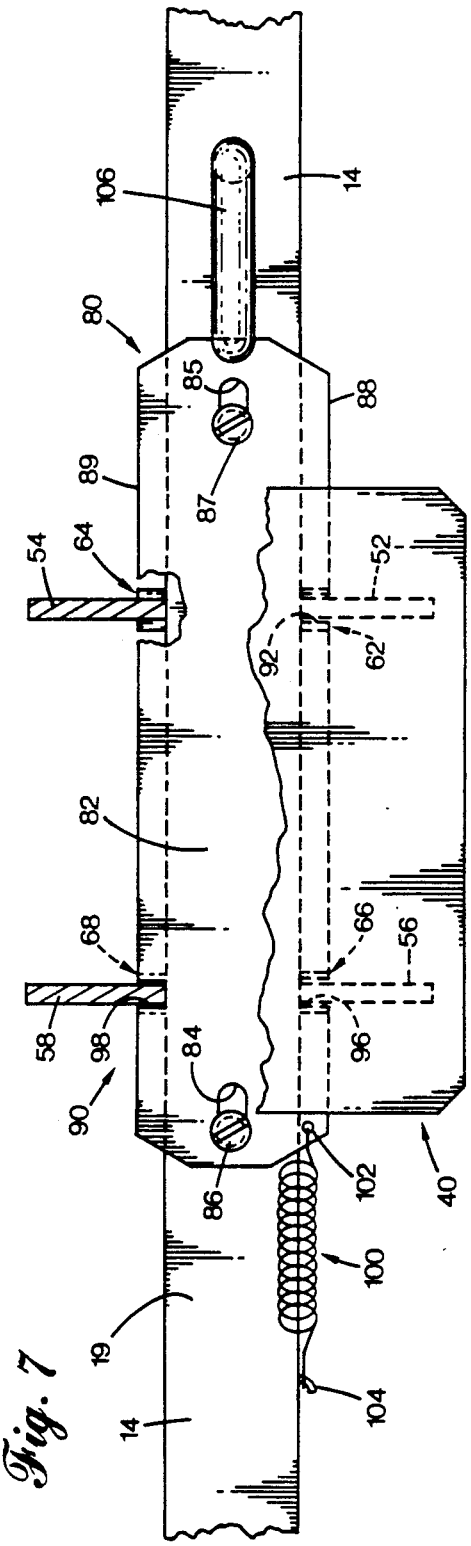

TEMPORARY TRANSMISSION/ENGINE SUPPORT SYSTEM

BACKGROUND OF THE INVENTION

The present invention relates generally to a vehicle power train support system for temporarily supporting from a vehicle frame a portion of a vehicle power train, such as an engine and/or a transmission during vehicle maintenance or repair.

A vehicle power train is typically disassembled for repair and maintenance several times during the life of a vehicle. For example, the engine may be removed for overhaul leaving the transmission and transfer box (if applicable) coupled via a drive shaft and universal joints to the vehicle drive axle assembly. Often during such maintenance, replacement parts need to be ordered before the power train can be reassembled. Parts delivery may take several days or weeks, during which time the power train remains disassembled. To allow other vehicles to be worked on in the repair shop while waiting for parts delivery, it is often desirable to tow the partially disassembled vehicle to another location, such as an outdoor parking lot.

Other suspension systems have been used to support an engine and/or transmission from a vehicle frame during vehicle manufacture and repair. In one known system, chains are either wrapped around or suspended under the unit to be suspended. The chains are then fastened to the vehicle frame. However, this system does often not securely support the unit. For example, when the vehicle is towed to a separate storage location, the chains often slip, causing damage to the unit or other parts of the vehicle.

In another known system, lumber, such as that having a 4" by 4" cross section, is placed across the vehicle front fenders or the vehicle cab floor pan. A chain or rope is secured to each end of the lumber and extends under the vehicle to cradle and support the engine or transmission. This system suffers the same likelihood of slipping and misalignment as that described above. Furthermore, if the lumber extends through the cab floor pan, the vehicle doors must be left open. This method clearly curtails long term outdoor storage of the vehicle. Furthermore, if the lumber extends significantly beyond the width of the vehicle, the vehicle is more difficult to tow through shop bay doors, and more likely to present an injury hazard to those working around the vehicle.

In a third method, the engine or transmission is supported from the floor or ground under the vehicle using a jack and/or blocks. This method disadvantageously prevents the vehicle from being towed to a separate storage location.

Thus, a need exists for an improved temporary transmission/engine support system for temporarily supporting from a vehicle frame a portion of a vehicle power train, such as a vehicle engine, transmission or the like, which is directed toward overcoming, and not susceptible to, the above limitations and disadvantages.

SUMMARY OF THE INVENTION

According to one aspect of the present invention, a vehicle power train support apparatus is provided for temporarily supporting from a vehicle frame a portion of a vehicle power train. The apparatus includes a transverse support member having two opposing ends. A pair of suspension members are each mounted to one of the transverse support member ends to receive suspension means to detachably attach the apparatus to the vehicle frame. The apparatus also includes a support table mounted to the transverse support member to support a portion of the vehicle power train.

In an illustrated embodiment, the transverse support member comprises a telescoping member adjustable in length to accommodate varying widths of vehicle frames. The support table is adjustably mounted to the transverse support member so that the table may be adjusted in a substantially vertical direction with respect to the transverse support member. The illustrated apparatus also includes a spring biased latch for adjustably mounting the support table to the transverse support member. The latch is biased by the spring into a table securing position and movable into a table adjusting position. The apparatus may also include a pair of flexible suspension devices attachable to the vehicle frame to serve as the suspension means each received by one the suspension members.

It is an overall object of the present invention to provide an improved temporary vehicle power train apparatus or engine/transmission support system for suspending from a vehicle frame a portion of a vehicle power train.

A further object of the present invention is to provide an improved vehicle power train support apparatus which provides secure support for a partially disassembled vehicle power train during towing.

An additional object of the present invention is to provide an improved vehicle power train support apparatus which is easily adjustable to accommodate a variety of vehicle widths, designs and styles.

Yet another object of the present invention is to provide an improved vehicle power train support apparatus which is safe and easy to use, and which speeds reassembly of a disassembled power train.

The present invention relates to the above features and object individually as well as collectively. These and other objects, features and advantages of the present invention will become apparent to those skilled in the art from the following description and drawings.

BRIEF DESCRIPTION OF THE DRAWINGS

FIG. 1 is a perspective view of one form of the temporary engine/transmission support system of the present invention shown suspended from a vehicle frame;

FIG. 2 is a perspective of a portion of the temporary engine/transmission support system of FIG. 1;

FIG. 3 is a front elevational view of the system of FIG. 1;

FIGS. 6 and 7 are partial top elevational views of the system shown in FIG. 3, taken along line 6—6 thereof, with FIG. 6 showing one form of a latch of the present invention biased into a table securing position, and FIG. 7 showing the latch in a table adjusting position; and FIG. 8 is an enlarged detailed view taken along lines 8—8 of FIG. 1.

DETAILED DESCRIPTION OF A PREFERRED EMBODIMENT

FIGS. 1-3 illustrate an embodiment of a temporary transmission/engine support system or temporary vehicle power train support apparatus 10, constructed in accordance with the present invention, for temporarily supporting from a vehicle frame F a portion P of a vehicle power train having an engine coupled with a transmission. The illustrated vehicle frame F includes a pair of frame beams, such as longitudinal frame beams $F_1$ and $F_2$. The power train supported portion P may be the engine, the transmission, or any other power train component, such as a transfer case, or any coupled combination of such components, including the entire power train assembly.

Figure 4:
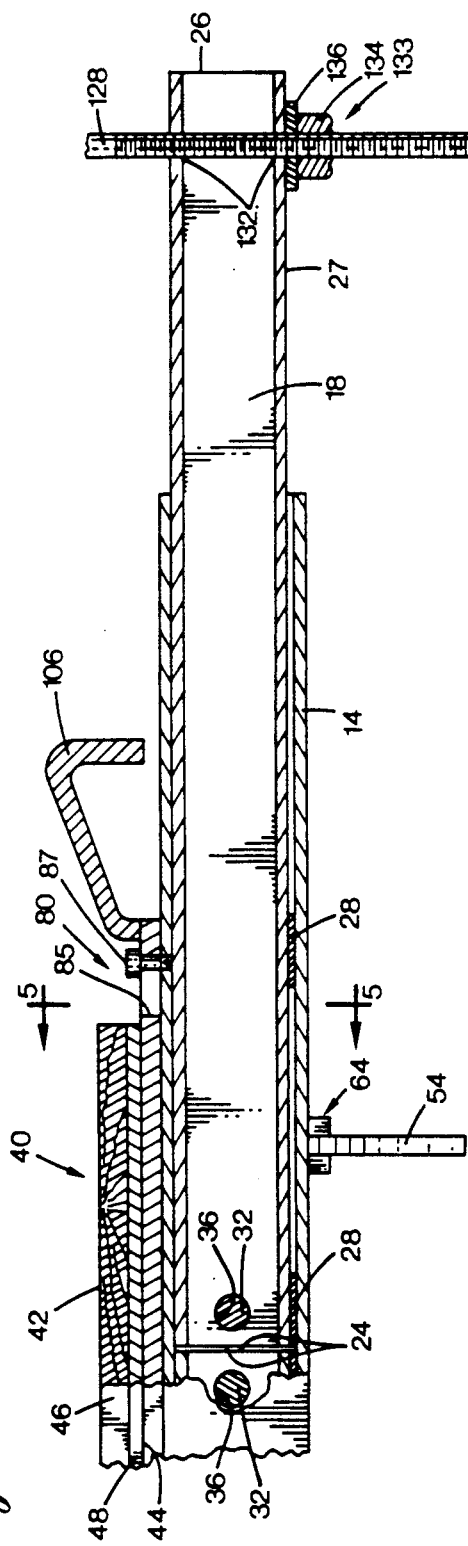
FIG. 4 is a sectional elevational view of a portion of system of FIG. 1 taken along a plane defined by lines 4—4 thereof.
Figure 5:
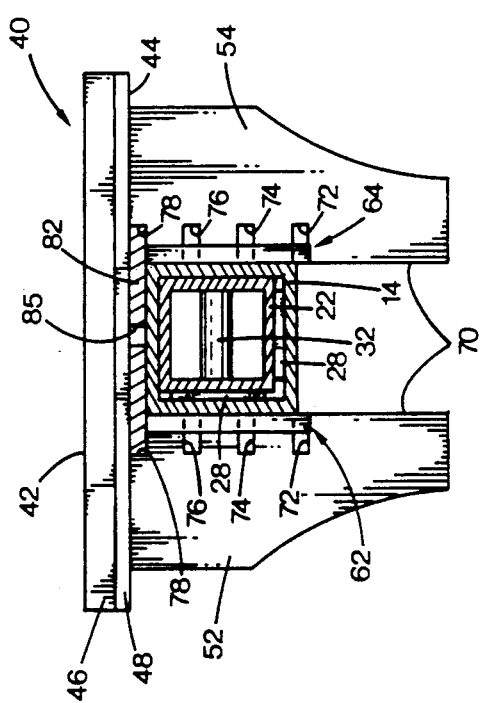
FIG. 5 is a sectional elevational view taken along line 5—5 of FIG. 4.

The apparatus 10 includes a transverse support member or support 12, illustrated as a telescoping member having a tubular medial member 14 with opposing ends 16, 18 and an upper surface 19. Referring also to FIG. 4, the transverse support 12 has two lateral members or arms 20 and 22, which each have opposing inboard and outboard ends 24, 26 and a lower surface 27. The inboard end 24 of each lateral arm 20, 22 is slidably received within the respective ends 16 and 18 of the medial member 14. As shown in FIGS. 4 and 5, optional shim pads 28 may be mounted to exterior wall surfaces of the lateral arms 20 and 22 if desired to romote a closer or smoother sliding fit between the lateral arms 20, 22 and the medial member 14.

Referring to FIGS. 3 and 4, the transverse support 12 also has a length securing device, such as two through pin cotter key assemblies 30. Each key assembly 30 has a through pin 32 and a cotter key 33. The medial member 14 has a plurality of substantially horizontally aligned holes 34 extending through both side walls. The lateral arms 20 and 22 each have holes 36 extending through both side walls of the arms. The arm holes 36 are alignable with holes 34 when the arms slide within the medial member 14. The pin 32 engages holes 34 and 36 to secure the longitudinal position of the arms 20 and 22 with respect to the medial member 14 and to fix the length of the telescoping support 12.

Referring to FIGS. 3 and 4, the illustrated apparatus 10 has a support table 40 mounted to the transverse support 12 for supporting the portion P of the vehicle power train (see FIG. 3). The table 40 has opposing upper and lower surfaces 42 and 44, respectively. A replaceable wooden upper table surface liner 46 is screwed to a metal table base plate 48 to provide the upper surface 42. The wooden upper surface 42 protects both the metal base plate 48 and the supported power train portion P from damaging one another.

In the illustrated embodiment, the table 40 is adjustably mounted to the medial member 14 by a table support system 50. The table support system 50 includes two pair of legs 52, 54 and 56, 58 which may be welded or otherwise rigidly secured to the metal base plate 48. Each pair of legs 52, 54 and 56, 58 extends downwardly from the table lower surface 44, with each pair of legs surrounding the medial member 14.

The medial member 14 includes a table guide system 60, illustrated as including four pair of guide members 62, 64, 66 and 68 surrounding the respective table legs 52, 54, 56 and 58. It is apparent that while the illustrated guide system 60 is comprised of pairs of guide members, single guide members, such as four guides all located either inboard or outboard of the table legs (not shown) may be useful in some applications. Alternatively, the guide system 60 may comprise four substantially vertical recesses cut within the exterior sidewalls of the medial member 14.

As illustrated in FIG. 5, the table legs 52, 54, 56 and 58 each have an inner edge, such as edge 70, adjacent the medial member 14. A plurality of leg slots 72, 74, 76 and 78 extend inwardly from edge 70 into each leg 52, 54, 56 and 58. The leg slots 72-78 are located in each leg 52-58 to form four leg slot groups, with each group lying in a plane substantial coplanar with the table upper surface 42 and defined by the illustrated slots 72, 74, 76 and 78.

Referring to FIGS. 6 and 7, the illustrated apparatus 10 includes a latch 80 for adjustably mounting table 40 to the transverse support 12. The latch 80 has a main latch body 82 with two mounting slots 84 and 8 formed therein. The latch 80 is slidably secured to the medial member 14 by two screws 86 and 87. The screws 86 and 87 extend through the respective latch mounting slots 84 and 85, and threadably engage holes tapped into the medial member upper surface 19. The latch body 82 also has two opposing side edges 88, 89. The latch 80 includes a table securing and adjusting system 90 comprising two pair of latch slots 92, 94 and 96, 98. The latch slots 92 and 96 extend inwardly into the latch body 82 from edge 88, and slots 94 and 98 extend inwardly from edge 89.

The illustrated latch 80 is biased by biasing means, such as a bias spring 100, into a table securing position as shown in FIG. 6. The latch body 82 has a hole 102 and the medial member 14 has a spring securing member, such as a screw or hook 104. The spring 100 couples the latch hole 102 to medial member hook 104. As shown in FIG. 6, the latch slots 92, 94, 96 and 98 are located within the latch body 82 such that the latch 80 is normally biased into a table securing position. In the table securing position, the latch side edges 88 and 89 engage the leg slots of a leg slot group. For example, in FIG. 5 the table is adjusted to its lowest position with the latch body 82 engaging the leg slot group defined by the leg slots 78 in each of the table legs 52-58.

The latch also includes a handle member 106 for drawing the latch 80 into a table adjusting position as shown in FIG. 7. In the table adjusting position the leg slots 72, 74, 76 or 78 within a leg slot group are disengaged by the latch body 82, and the latch slots 92, 94, 96 and 98 are aligned with the respective table legs 52, 54, 56 and 58 to allow the table 40 to be vertically adjusted. The illustrated table leg slots 72-78 have approximately ½ inch of vertical spacing between each leg slot. Thus, course vertical adjustments are provided by moving the table 40 between these various leg slot positions of engagement with latch 80. Other height adjustments of the upper table surface 42 with respect to the frame F may be provided by a suspension system 110 which couples the transverse support 12 to the vehicle frame F (see FIG. 1).

The illustrated vehicle frame beams $F_1$ and $F_2$ each have a wall with at least two holes therethrough, such as hole H shown in FIG. 8. The holes H may be preexisting holes in the frame, or drilled therein for mounting the apparatus 10 to the frame. The two holes H are separated by a distance as shown in FIG. 1, with one hole being located toward the front of the vehicle, and the other located near the rear.

The suspension system 110 includes a pair of suspension devices 112 and 114. Each suspension device 112, 114 has a flexible member 116, which may be a chain, heavy duty nylon strapping or the like. Each flexible member has two ends which each terminate in an offset eye anchor member, such as anchor 118 shown in FIG. 8. Each anchor 118 is receivable within one of the holes H within the frame beams $F_1$ and $F_2$. Thus, the suspension devices 112 and 114 are suspendable from the longitudinal frame beams $F_1$ and $F_2$. Each suspension device 112, 114 also has a length adjusting member 120, which may be a bolt and nut assembly or a hook for the chain embodiment, or a buckle member for a strapping embodiment. Any excess slack 122 in the flexible member 116 may be removed therefrom using the length adjusting member 120.

The apparatus 10 has a pair of suspension members 124 and 126 each mounted to one of the lateral arms 20 and 22, respectively, adjacent the outboard ends 26. Each suspension member 124, 126 has an eyebolt 128 and a hook member 130 secured through the eye portion of eyebolt 128. The hook member 130 of each suspension member 124 and 126 engages chain 116 of suspension devices 112 and 114, respectively. Each lateral arm 20, 22 has a pair of vertically aligned holes 132 extending therethrough and located adjacent the outboard end 26 (see FIG. 4). The threaded portion of eyebolt 128 of each suspension member 124, 126 is slidably received through the pair of holes 132. Each eyebolt 128 is adjustably secured in the vertical direction using a fine adjustment assembly 133 comprising a nut 134 and washer 136. The fine adjustment assemblies 133 are drawn by the weight of suspended apparatus 10 into contact with the lower surface 27 of the lateral arms 20 and 22.

Relatively gross vertical adjustments may be accomplished by removing slack 122 from the suspension device flexible member 116 using the length adjusting member 120. Further gross vertical adjustments of the table 40 with respect to the frame F are accomplished by drawing latch 80 into the table adjusting position (see FIG. 7), then raising or lowering the support table 40 to the desired vertical adjustment, and finally allowing spring 100 to draw latch 80 back into the table securing position (see FIG. 6). Fine vertical adjustments of the support table 40 with respect to the vehicle frame an power train portion P are accomplished by turning nuts 134 on the threaded portion of eyebolts 128 of each suspension member 124, 126.

Note that other alternatives to the illustrated suspension system 110 may be used. For example, chains or other flexible or rigid members may be located to receive the suspension member hooks 130 and attached to the vehicle or frame F in configurations other than that shown in FIG. 1. Furthermore, the suspension member hooks 130 may engage each suspension device 112, 114 along various positions, allowing the transverse support 12 to be oriented at angles other than the illustrated orientation perpendicular to the frame beams $F_1$ and $F_2$ as shown in FIG. 1. Additionally, it is apparent that the suspension devices 112 and 114 may run between the frame beams $F_1$ and $F_2$ if required for a particular application, allowing the transverse support 12 to be oriented substantially parallel with the frame beams $F_1$ and $F_2$.

Additionally, while the suspension members 124 and 126 are each illustrated as having hooks 130 attached to suspension system 110, it is apparent that the hook members 130 may be adapted to be attached directly to the vehicle frame F. Thus, the apparatus 10 optionally may or may not include the suspension system 110.

In operation, the suspension system 110 if used, is first secured to the vehicle frame F in the illustrated embodiment by inserting offset eye hooks 118 into holes H of the frame beams $F_1$ and $F_2$. Any slack 122 within the chain 116 of suspension devices 112 and 114 may be removed therefrom using the length adjusting bolt or hook 120. If the flexible member 116 is a strap, any slack 122 may be removed using length adjusting member 120 comprising a buckle member (not shown). The length of the transverse support 12 is adjusted by disassembling the through pin and cotter key assemblies 30, sliding the lateral arms 20 and 22 inwardly or outwardly from the medial member 14 to the desired overall length. Pins 32 are then inserted through holes 34 of the medial member 14 and holes 36 of the lateral arms 20, 22 and secured in position using the cotter keys 33. Either before or after adjustment of the transverse support 12 length, the suspension members 124 and 126 are secured using hooks 130 to either the vehicle frame F or the suspension system 110.

Gross vertical adjustments of the support table upper surface 42 with respect to the medial member upper surface 19 are then made using the suspension system 110 and/or latch 80. The latch 80 is first drawn into the table adjusting position by pulling handle member 106 toward lateral arm 22 as shown in FIG. 7. In this position, the latch slots 92, 94, 96 and 98 are aligned with the respective table legs 52, 54, 56 and 58. The table 40 is then moved vertically to a desired location with one of the table leg slot groups 72, 74, 76 or 78 aligned vertically with the latch body 82. In this position, spring 100 is allowed to return latch 80 to the table securing position, where the latch body edges 88 and 89 engage the leg slots of a leg slot group as shown in FIG. 6.

Fine vertical adjustments of the support table upper surface 42 with respect to the frame F are accomplished by turning nuts 134 on the suspension members 124 and 126. In this manner, the table 40 may be positioned beneath the power train portion P and adjusted upwardly to support the power train portion P. With the power train portion P supported from below by the table 40, it may be strapped, chained or otherwise secured to the apparatus 10 allowing the vehicle to be towed to another location. In this manner, the apparatus 10 provides a firm support for the power train portion P.

While conveying the vehicle with the power train portion P thusly supported, alignment of portion P with other vehicle components is maintained, and damage to these other components is minimized or virtually eliminated. Additionally, since the apparatus 10 maintains alignment of the power train portion P, labor time in reassembling and aligning the power train is minimized. The reassembly and realignment will also be more accurate and easier when the power train portion P is supported by the apparatus 10. For example, the power train portion P may be raised or lowered into alignment if required using the fine adjustment nuts 134.

Use of the apparatus 10 saves labor time and allows a vehicle maintenance shop bay to be cleared for the repair of other vehicles if, for instance, a parts delivery delay occurs. Additionally, this system enhances worker safety since the apparatus 10 may be secured to the vehicle undercarriage without extending therebeyond. Also, the ease of adjusting the height of table 40, using latch 80 and nuts 134 significantly increases operator safety.

After use, the apparatus 10 is detached from the vehicle by loosening nuts 134 and/or moving latch 80 to the table adjusting position. The hooks 130 are then disengaged from the vehicle frame F or the suspension system 110 if used, and the suspension system 110 is removed from the vehicle frame.

Having illustrated and described the principles of my invention with respect to a preferred embodiment, it should be apparent to those skilled in the art that my invention may be modified in arrangement and detail without departing from such principles. For example, other configurations of the transverse support 12 are also possible, such as one comprising only two telescoping members, as well as suitable material substitutions and dimensional variations for the components of the apparatus. I claim all such modifications falling within the scope and spirit of the following claims.

I claim:

1. A vehicle power train support apparatus for temporarily supporting from a vehicle frame a portion of a vehicle power train, the apparatus comprising:
   a transverse support member having two opposing ends;
   a pair of suspension members each mounted to one of the transverse support member ends to receive suspension means to detachably attach the apparatus to the vehicle frame; and
   a support table mounted to the transverse support member to support a portion of the vehicle power train, the support table being adjustably mounted to the transverse support member for adjustment in a substantially vertical direction with respect to the transverse support member.

2. A vehicle power train support apparatus according to claim 1 wherein the transverse support member comprises a telescoping member adjustable in length to accommodate varying widths of vehicle frames.

3. A vehicle power train support apparatus according to claim 1 further including a biased latch for adjustably mounting the support table to the transverse support member, the latch biased into a table securing position and movable into a table adjusting position.

4. A vehicle power train support apparatus for temporarily supporting from a vehicle frame a portion of a vehicle power train, the apparatus comprising:
   a transverse support member having two opposing ends;
   a pair of suspension members each mounted to one of the transverse support member ends to receive suspension means to detachably attach the apparatus to the vehicle frame, each of the pair of suspension members being adjustably mounted to the transverse support member for adjustment of the transverse support member in a substantially vertical direction with respect to the vehicle frame; and
   a support table mounted to the transverse support member to support a portion of the vehicle power train.

5. A vehicle power train support apparatus for temporarily supporting from a vehicle frame a portion of a vehicle power train, the vehicle frame having a pair of frame beams each having at least two holes therethrough, the apparatus comprising:
   a transverse support member having two opposing ends;
   a pair of suspension members each mounted to one of the transverse support member ends to receive suspension means to detachably attach the apparatus to the vehicle frame, a pair of suspension devices, each suspension device comprising a flexible member having two ends each terminating in an offset eye anchor member receivable within one of the two holes within one frame beam, with each suspension device also having a length adjusting member, such that each suspension device is suspendable from one of the frame beams and any excess slack in the flexible member is removable therefrom using the length adjusting member, the pair of suspension devices serving as the suspension means so each of the pair of suspension members is suspended from one of the suspension devices; and
   a support table mounted to the transverse support member to support a portion of the vehicle power train.

6. A vehicle power train support apparatus for temporarily supporting from a vehicle frame a portion of a vehicle power train, the apparatus comprising:
   a transverse support member;
   a suspension system mounted to the transverse support member for suspending the support member from a vehicle frame; and
   a support table adjustably mounted to the transverse support member for positioning the table in a substantially vertical direction relative to the support member so as to support a portion of the vehicle power train on the table.

7. A vehicle power train support apparatus accord to claim 6 further including a spring biased latch slidably attached to the support member for adjustably securing the support table at various positions relative to the support member.

8. A vehicle power train support apparatus according to claim 6 wherein the support member comprises a telescoping member adjustable in length to accommodate varying widths of vehicle frames.

9. A vehicle power train support apparatus according to claim 6 wherein:
   the table has opposing upper and lower surfaces with two pair of legs extending downwardly from the lower surface, each pair of legs surrounding the support member, and each of the legs having an inner edge adjacent the support member and a plurality of leg slots extending therein from the inner edge, with the leg slots being located in each leg to form a leg slot group with respect to each of the other legs, such that each leg slot group lies in a plane substantially coplanar with the table upper surface; and
   the apparatus further includes a biased latch for adjustably mounting the support table to the support member, the latch having two opposing outer edges, the latch biased into a table securing position and movable into a table adjusting position, the latch having two pair of latch slots extending inwardly from each of the outer edges, the latch slots positioned so the latch outer edges engage the leg slots when the latch is biased into the table securing position, the latch slots also positioned disengage the legs when the latch is moved into the table adjusting position.

10. A vehicle power train support apparatus according to claim 9 wherein the support member has two pair of substantially vertical table guides, each pair of table guides positioned to engage a respective pair of table legs to fix the table at a lateral position relative to the support member.

11. A vehicle power train support apparatus for temporarily supporting from a vehicle frame a portion of a vehicle power train, with the vehicle frame having a pair of frame beams each having at least two holes therethrough, the apparatus comprising:

a telescoping transverse support member including a tubular medial member and two lateral arms, the medial member having an upper surface, and each lateral arms having opposing inboard and outboard ends, with each lateral arms inboard end slidably received within opposing ends of the medial tubular member so the support member is adjustable in length to accommodate varying widths of vehicle frames, the medial member having an upper surface and two pair of substantially vertical guides;

a suspension system comprising a pair of suspension members each adjustably mounted to one of the outboard ends of the lateral arms for adjustment of the transverse support member in a substantially vertical direction with respect to the vehicle frame, and a pair of suspension devices, with each suspension device comprising a flexible member having two ends each terminating in an offset eye anchor member receivable within one of the two holes within one frame beam, each suspension device also having a length adjusting member, such that each suspension device is suspendable from one of the frame beams and any excess slack in the flexible member is removable therefrom using the length adjusting member, each of the pair of suspension members being suspended from one of the suspension devices, so the suspension system is detachably attachable to varying sizes of vehicle frames for suspending the transverse support member at various distances therefrom;

a support table having opposing upper and lower surfaces with two pair of legs extending downwardly from the lower surface, each pair of legs surrounding the support member and slidably received by each pair of guides on the medial member to fix the table at a lateral position relative to the support member, each of the legs having an inner edge adjacent the support member and a plurality of leg slots extending therein from the inner edge, the leg slots of positioned in each leg to form a leg slot group with respect to each of the other legs, such that each leg slot group lies in a plane substantially coplanar with the table upper surface, the table upper surface positionable to support a portion of the vehicle power train; and a spring biased latch slidably attached to the support member and having two opposing outer edges, the latch biased into a table securing position and movable into a table adjusting position, the latch having two pair of latch slots extending inwardly from each of the opposing outer edges, the latch slots positioned so the latch outer edges engage the leg slots when the latch is biased into the table securing position, the latch slots also positioned disengage the legs when the latch is moved into the table adjusting position.

* * * * *